June 13, 1944.     R. ARIO     2,351,314
LOCKING DEVICE FOR ROLL-OFF VAN BODIES
Filed May 20, 1943

INVENTOR.
Rudolf Ario, (deceased)
by Stephania Ario, (executrix)
Harry Radzinsky
Attorney Patented June 13, 1944

2,351,314

UNITED STATES PATENT OFFICE 2,351,314

LOCKING DEVICE FOR ROLL-OFF VAN BODIES

Rudolf Ario, deceased, late of Brooklyn, N. Y., by Stephania Ario, executrix, Brooklyn, N. Y.

Application May 20, 1943, Serial No. 487,726

3 Claims. (Cl. 296—35)

This invention relates to storage vans or similar structures in which a van body is mounted on a vehicle chassis in such a manner as to permit the van body to be rolled from the chassis as a unit and placed in a storage warehouse to thereafter act as a storage room for the contents originally placed in it while it was on the vehicle chassis.

More particularly, the invention relates to an improved locking means by which the van body is secured in place on the chassis and prevented from shifting movement thereon, especially while the vehicle is in transit. The primary object of the invention is to provide a locking device by means of which the attachment of the van body to the chassis is rendered firm and secure, yet by which the van body may be quickly freed when desired, to permit the same to be rolled from the chassis with a minimum of effort and delay.

The invention contemplates the provision of locking means at the rear of the vehicle in the form of a pivoted latch member mounted on the chassis and swingable to engage in an aperture in a beam located on the underside of the van body, together with means for holding said latch in place in the aperture, as well as means by which the latch may be speedily manually disengaged when desired.

Figure 1:
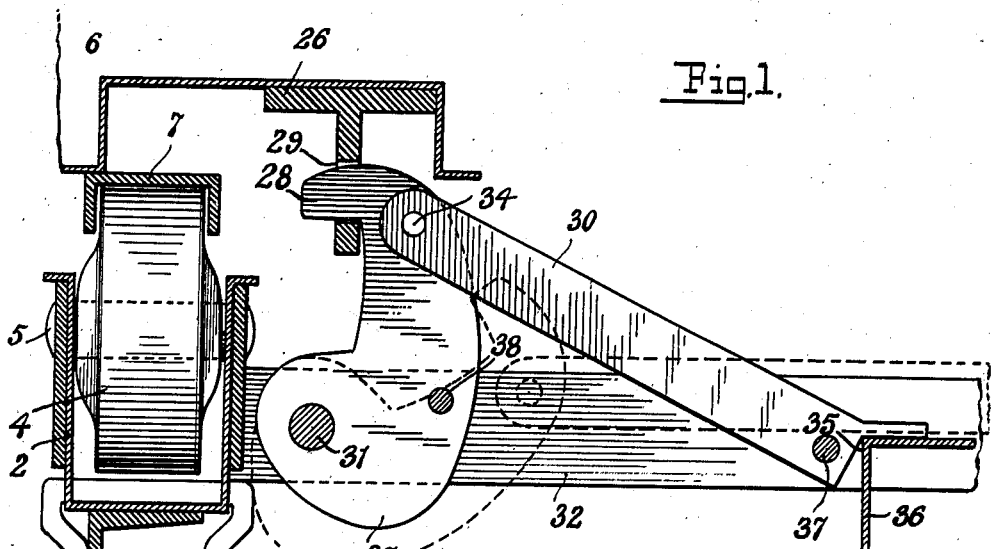
Figure 2:
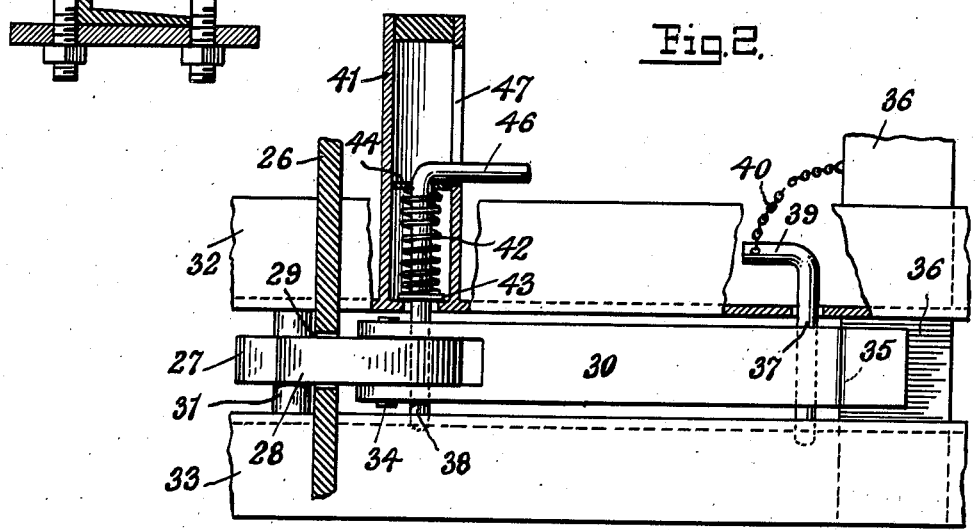

In the accompanying drawing, forming a part hereof, Fig. 1 is a vertical sectional view through parts of the chassis frame and frame of the van body, showing one of the rear locks, and Fig. 2 is a plan view of the structure of Fig. 1, with parts in section and other parts broken away to disclose construction.

In a structure of the character to which this invention relates, the van body is arranged to move on rollers on or off the chassis of the vehicle, various roller arrangements permitting such movement having been devised. In Fig. 4 of the drawing, one of the rails of the vehicle chassis is shown at 1, the same holding a channel member 2, by means of the U-bolt 3, the channel member carrying a roller 4 rotative on the axle or bearing 5. A number of rollers, so mounted, are carried on the rails of the chassis of the vehicle, and said rollers support the van body, a portion of which is shown at 6, while it is on the chassis. The underside of the van body is provided with channel rails, one of which is shown at 7, which ride on the rollers 4.

To maintain the van body in place on the chassis, front and rear locking devices are usually provided, the present invention relating to a rear locking device.

Referring now to the rear lock, usually operative in conjunction with a front lock, for holding the van body in place on the chassis, on the bottom of the van body, are several T-beams, one of which is shown in Figs. 1 and 2, and is indicated at 26. The rear locking device, shown in Figs. 1 and 2, is employed at the rear of the chassis, one of each of which is situated toward each side of the chassis at the rear thereof. Each rear locking device includes a pivoted latch member 27, having a nose portion 28 adapted to enter into an aperture in one of the T-beams 29 and be maintained therein, or in locked position, by means of a brace member or prop 30.

The latch member 27 is eccentrically pivoted on pivot pin 31 which extends between spaced angle irons 32 and 33, forming part of a frame on the chassis in which the locking device is mounted. Near its nose portion 28, the latch member 27 is pivotally attached at 34 to one end of the brace member 30, the opposite end of the brace member being provided with an angular notch 35 adapted to seat against an angle rail 36 on the chassis and extending between the angle irons 32 and 33.

Pins 37 and 38 are provided for holding the device in locked position, the pin 37 being located adjacent to the free end of the brace member 30. Said pin 37 is manually placed in position and similarly removed, and it consists of a sliding bolt adapted to be thrust through aligned holes in the brace member 30 and in the vertical flanges of the angle irons 32 and 33, as clearly shown in Fig. 2, at a time when the notched end 35 of the brace member 30 is seated over the angle rail 36 of the chassis. Pin 37 is provided with an off-set end or handle portion 39, secured to one end of a chain 40, the opposite end of the chain being attached to rail 36. The chain prevents loss of the pin 37 when it is not in its engaged position.

Locking pin 38 is spring-pressed, and is slidable in a barrel 41 secured to the angle iron 32, said barrel containing a compression spring 42, operative between the stop 43 on the pin 38 and the fixed stop 44 within the barrel, to normally thrust the pin 38 into projected position wherein it extends through aligned holes in the angle irons 32 and 33 and through the latch member 27. An off-set portion or handle 46 is provided on the pin 38 to enable the pin to be manually retracted against the pressure of the spring 42. A slot 47 in the barrel 41 permits manual retractive movement of the bolt or pin 38.

The rear locking device is shown in its locked position in Figs. 1 and 2. It will be there seen that the nose portion 28 of the latch 27 is projected through the aperture 29 in the T-beam 26. It will be seen also, that at this time, the spring-pressed locking pin 38 extends through the latch 27 and through the angle irons 32 and 33, thus holding the latch 27 against descent or movement to unlocked position. At this time also, the brace member 30, having its notched end 35 seated over the rail 36, and its locking pin 37 extended through it and through the angle irons 32 and 33, is securely held in braced position to act as a prop and maintain the latch 27 in engagement with the aperture 29. To unlock or lower the latch 27, the pin 37 is drawn out to permit the notched end of the brace 30 to be raised and extended over the top of rail 36, as shown in dotted lines in Fig. 1. Next the locking pin 38 is drawn outwardly and latch 27 can then be swung downwardly as shown in dotted lines, and out of the aperture 29, to assume a lowered and disengaged position.

While the locking device shown and described herein has been referred to as a rear lock, it will be obvious that it need not necessarily be limited to such a position on the chassis, but may be located wherever found necessary to securely hold the van body in place on the chassis. Therefore, in herein referring to the lock as a rear lock I wish to be understood as using this term merely for the purpose of pointing out a preferred location for the lock rather than to indicate a necessity for locating the lock at the position mentioned.

What is claimed is:

1. In a roll-off van body mounting, a vehicle chassis, a van body provided with means by which it may be rolled off the chassis, the van body having an under-beam, the chassis having a frame provided with spaced members located below the beam, the beam having an aperture, a swinging latch eccentrically pivoted between the spaced chassis-members and swingable upwardly to enter into the aperture, a brace having one end pivoted to the latch and having a free other end, said latter end being adapted for fitment over a chassis part to cause the brace to act as a prop to thereby hold the latch in position of engagement with the aperture, a spring-pressed locking pin mounted on one of the spaced chassis-members and entrant through the same and into the latch to hold the latch in position of engagement with the aperture, and a manually movable locking pin entrant through one of the spaced chassis-members and through the brace when said brace is in position to act as a prop for the latch.

2. In a roll-off van body mounting, a vehicle chassis, a van body provided with means by which it is rolled off the chassis, the van body having an under-beam, the chassis having a frame provided with spaced members disposed transversely of the under-beam, the under-beam having an aperture, a swinging latch pivoted between the spaced members and swingable to engage with the aperture, said latch having a hooked end entering into said aperture, a brace having one end pivoted to the latch adjacent to the hooked end thereof, said brace having a free other end, the other end being notched for removable fitment over a chassis part to cause the brace to act as a prop to thereby hold the latch in engagement with the aperture, a spring-pressed locking pin mounted on one of the chassis members, the latch being provided with an opening through which said pin is extended when the latch is engaged with the aperture, and a manually movable bolt for engaging the brace member to hold said brace member in position to act as a prop for the latch.

3. In a roll-off van body mounting, a vehicle chassis, a van body provided with means by which it is rolled off the chassis, the van body having a beam, the chassis having a frame including spaced members extending transversely to the beam, a latch member pivoted between said spaced members and having a hooked nose remote from its pivot, a brace member consisting of a bar pivoted at one end to the latch member and its other end free, the beam having an aperture into which the hooked nose of the latch member enters when the latch member is swung upwardly on its pivot, a spring-pressed locking pin engaging the latch member when said latch member is engaged with the aperture and holding said latch member in such engagement, a support extending transversely to the spaced members and having a part bridging the space between said members, the brace member having a notched free end for fitment over said part of the support to thereby hold said brace member in position as an angular prop for the latch member, and a manually operated locking bolt slidable through the brace member adjacent to its notched end and through the spaced members, to hold the brace member in position as a prop for the latch member.

STEPHANIA ARIO,
*Executrix of the Estate of Rudolf Ario, Deceased.*